(12) United States Patent
Hsu et al.

(10) Patent No.: US 9,356,403 B1
(45) Date of Patent: May 31, 2016

(54) SATA HARD DISK DRIVE CONNECTOR

(71) Applicant: COMPONENT USER INDUSTRY CO., LTD., Taoyuan (TW)

(72) Inventors: Kuo Chen Hsu, Taoyuan (TW); Chi Sen Chang, Taoyuan (TW); Tzu Han Wu, Taoyuan (TW)

(73) Assignee: COMPONET USER INDUSTRY CO., LTD. (TW)

( * ) Notice: Subject to any disclaimer, the term of this patent is extended or adjusted under 35 U.S.C. 154(b) by 0 days.

(21) Appl. No.: 14/798,670

(22) Filed: Jul. 14, 2015

(51) Int. Cl.
*H01R 25/00* (2006.01)
*H01R 13/6592* (2011.01)
*H01R 9/05* (2006.01)

(52) U.S. Cl.
CPC .......... *H01R 13/6592* (2013.01); *H01R 9/0506* (2013.01)

(58) Field of Classification Search
CPC ....................................................... H01R 31/06
USPC ....................... 439/638; 307/149; 361/679.33
See application file for complete search history.

(56) References Cited

U.S. PATENT DOCUMENTS

| | | | | |
|---|---|---|---|---|
| 2011/0026222 A1* | 2/2011 | Sun | .......................... | G06F 1/185 361/679.58 |
| 2011/0216499 A1* | 9/2011 | Lee | ............................. | G06F 1/16 361/679.37 |
| 2011/0235264 A1* | 9/2011 | Sun | ...................... | G11B 33/122 361/679.33 |
| 2012/0262874 A1* | 10/2012 | Sun | .......................... | G06F 1/189 361/679.33 |

\* cited by examiner

*Primary Examiner* — Phuonghi T Nguyen
(74) *Attorney, Agent, or Firm* — Schmeiser, Olsen & Watts, LLP

(57) ABSTRACT

A SATA hard disk drive connector includes a body connected to a SATA hard disk drive; a signal pin unit disposed at the body and having signal transmitting/receiving pins and first grounding pins; a power pin unit disposed at the body and having power pins and second grounding pins; four micro coaxial cables each having a conducting wire, insulating layer, shielding layer and insulating coating, with the conducting wires connected to the signal transmitting/receiving pins at one end and to an external cable at another end; a first grounding unit disposed at the body and connected to an end of each shielding layer and the first grounding pins; a second grounding unit disposed at the body and connected to the second grounding pins, another end of each shielding layer, and external cable; and an electrical connection unit disposed at the body and connected to power pins and external cable.

9 Claims, 6 Drawing Sheets

SATA HARD DISK DRIVE CONNECTOR

FIELD OF TECHNOLOGY

The present invention relates to SATA hard disk drive connectors and, more particularly, to a SATA hard disk drive connector capable of grounding noise current to prevent noise from interfering with the exterior thereof.

BACKGROUND

In the face of the rapid development of information technology, there is an increasingly great demand for the enhancement of the efficiency of processing electronic data. To this end, SATA hard disk drives are introduced. A conventional SATA hard disk drive is typically connected to an external electronic device through a SATA hard disk drive connector. However, the conventional SATA hard disk drive connector inevitably transmits noise which interferes with an external electronic component; this drawback is serious especially when the SATA hard disk drive connector is exposed to an external environment. In view of this, it is important to provide a SATA hard disk drive connector capable of grounding noise current to prevent noise from interfering with the exterior thereof.

SUMMARY

In view of the aforesaid drawbacks of the prior art, the inventor of the present invention collected related data, considered and assessed the data comprehensively, conducted tests and corrections repeatedly according to the inventor's professional experience in the related industry, and eventually devised a SATA hard disk drive connector capable of grounding noise current to prevent noise from interfering with the exterior thereof.

In order to achieve the above and other objectives, the present invention provides a SATA hard disk drive connector, comprising: a body connected to a SATA hard disk drive; a signal pin unit disposed at the body and having a first signal transmitting pin, a second signal transmitting pin, a first signal receiving pin, a second signal receiving pin and a plurality of first grounding pins; a power pin unit disposed at the body and having a plurality of power pins and a plurality of second grounding pins; four micro coaxial cables each having a conducting wire, a tubelike insulating inner layer, a tubelike shielding woven layer and a tubelike insulating coating arranged from inside to outside, wherein the conducting wires are electrically connected to the first signal transmitting pin, the second signal transmitting pin, the first signal receiving pin and the second signal receiving pin, respectively, at one end and electrically connected to an external cable at another end; a first grounding unit disposed at the body and electrically connected to an end of each of the tubelike shielding woven layers and the first grounding pins; a second grounding unit disposed at the body and electrically connected to the second grounding pins, another end of each of the tubelike shielding woven layers, and the external cable; and an electrical connection unit disposed at the body and electrically connected to the power pins and the external cable.

As regards the SATA hard disk drive connector, the body has a receiving chamber, wherein a limiting opening is disposed at an edge of the receiving chamber, wherein the receiving chamber receives a plug of the external cable, wherein the limiting opening is smaller than the plug of the external cable to thereby confine the plug of the external cable to the receiving chamber.

As regards the SATA hard disk drive connector, a stop bump is disposed on each of two sides on top of the receiving chamber and protrudes into the receiving chamber such that the stop bumps abut against the plug of the external cable.

As regards the SATA hard disk drive connector, the body is provided with a first slot, the signal pin unit with three first grounding pins, and the first grounding unit with a first board, wherein an edge of the first board has a first engagement plate extending outward and bending, four first clamp slots extending outward and bending, and three first grounding plates extending outward and spaced apart from each other, wherein every two first clamp slots are disposed between every two first grounding plates, with the first engagement plate inserted into the first slot, wherein the first clamp slots each clamp an end of a corresponding one of the tubelike shielding woven layers, wherein the first grounding plates are electrically connected to the first grounding pins, respectively.

As regards the SATA hard disk drive connector, the body is provided with a second slot, the power pin unit with five second grounding pins, and the second grounding unit with a second board, wherein an edge of the second board has a second engagement plate extending outward and bending, four second clamp slots extending outward and bending, and three second outward grounding pins extending outward and spaced apart from each other, wherein every two second clamp slots are disposed between every two second outward grounding pins, with the second engagement plate inserted into the second slot, wherein the second clamp slots each clamp another end of a corresponding one of the tubelike shielding woven layers, wherein the second board is electrically connected to the second grounding pins, wherein the second outward grounding pins are electrically connected to the external cable.

As regards the SATA hard disk drive connector, the body is provided with a third slot, the power pin unit with three power pins, and the electrical connection unit with a third board, wherein an edge of the third board has a third engagement plate extending outward and bending and three third outward electrical connection pins extending outward and spaced apart from each other, with the third engagement plate inserted into the third slot, wherein the third board is electrically connected to the power pins, wherein the third outward electrical connection pins are electrically connected to the external cable.

As regards the SATA hard disk drive connector, the edge of the second board has five second grounding plates extending outward and spaced apart from each other, wherein the body is provided with a third slot, the power pin unit with three power pins, and the electrical connection unit with a third board, wherein the edge of the third board has a third engagement plate extending outward and bending, three third electrical connection plates extending outward and spaced apart from each other, and three third outward electrical connection pins extending outward and spaced apart from each other, with the third engagement plate inserted into the third slot, with the third electrical connection plates electrically connected to the power pins, respectively, with the second grounding plates electrically connected to the second grounding pins, respectively, wherein the third electrical connection plates are disposed between two second grounding plates and three second grounding plates, with the third outward electrical connection pins electrically connected to the external cable.

The SATA hard disk drive connector further comprises a protective lid, wherein two abutting blocks are disposed on an inner side of the protective lid and spaced apart from each other, wherein the protective lid is disposed at the body to hide the signal pin unit, the power pin unit, the micro coaxial cables, the first grounding unit, the second grounding unit and the electrical connection unit, wherein the protective lid hides a plug of the external cable, wherein the abutting blocks abut against two sides of the plug of the external cable, respectively.

As regards the SATA hard disk drive connector, a plurality of snap-engagement tenons is disposed at an edge of the body, and a plurality of snap-engagement arms is disposed at an edge of the protective lid, with the snap-engagement arms each having a snap-engagement mortise, wherein the snap-engagement mortises are snap-engaged with the snap-engagement tenons, respectively.

Accordingly, the present invention provides a SATA hard disk drive connector capable of grounding noise to prevent noise from interfering with any electronic component.

BRIEF DESCRIPTION

Objectives, features, and advantages of the present invention are hereunder illustrated with specific embodiments in conjunction with the accompanying drawings, in which.

DETAILED DESCRIPTION

Figure 1:
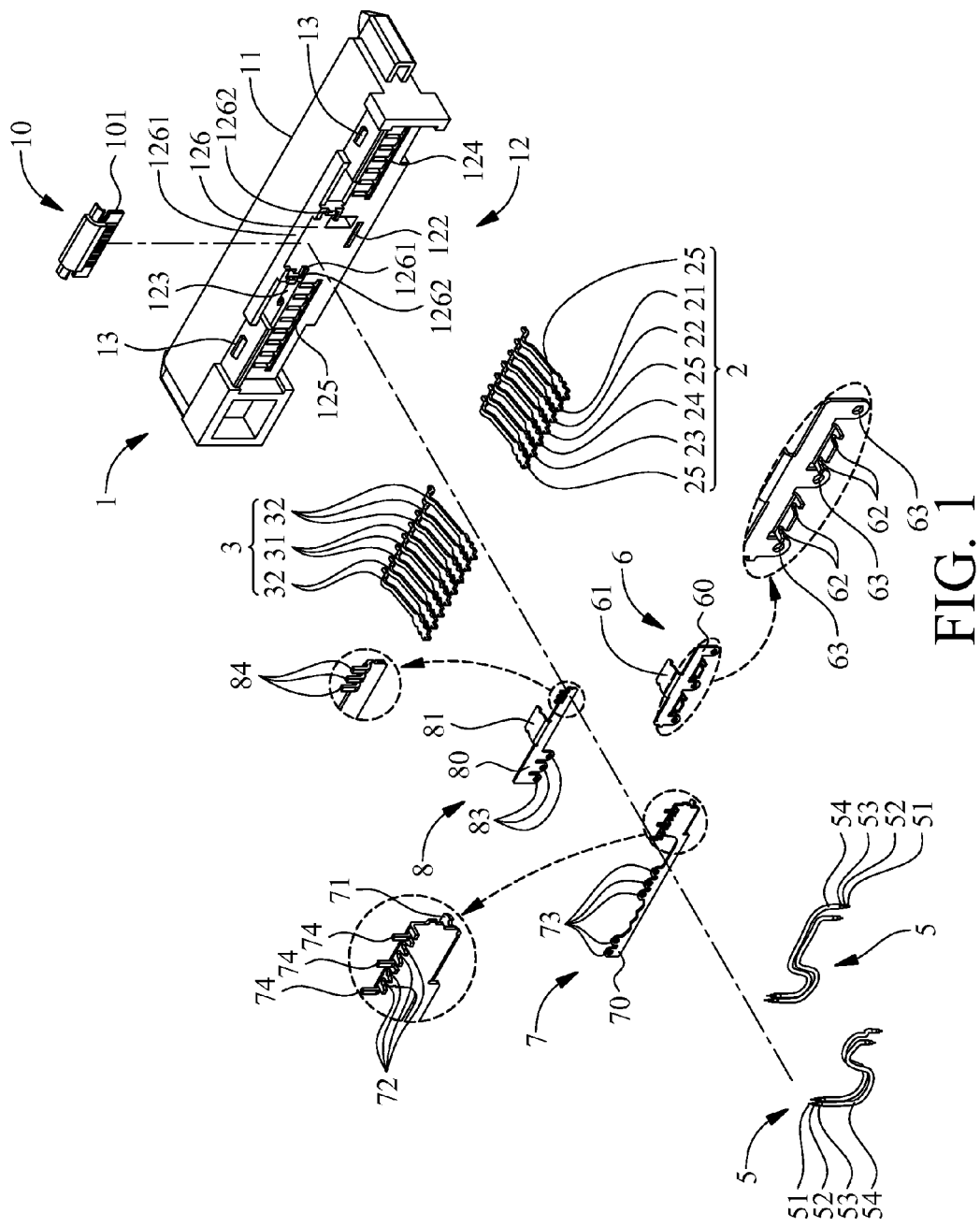
FIG. 1 is an exploded view of a SATA hard disk drive connector according to a preferred embodiment of the present invention.
Figure 2:
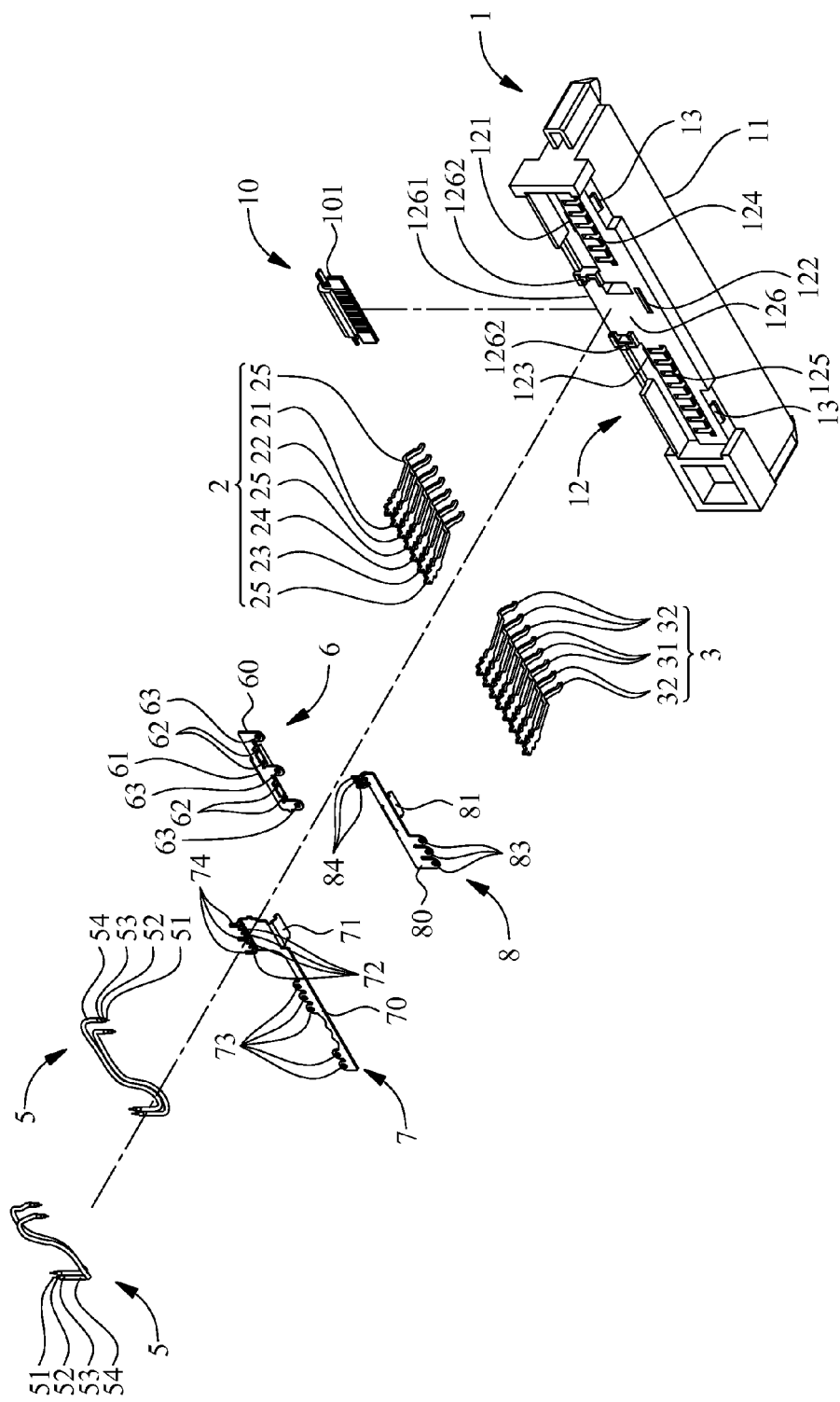
FIG. 2 is another exploded view of the SATA hard disk drive connector according to the preferred embodiment of the present invention.
Figure 3:
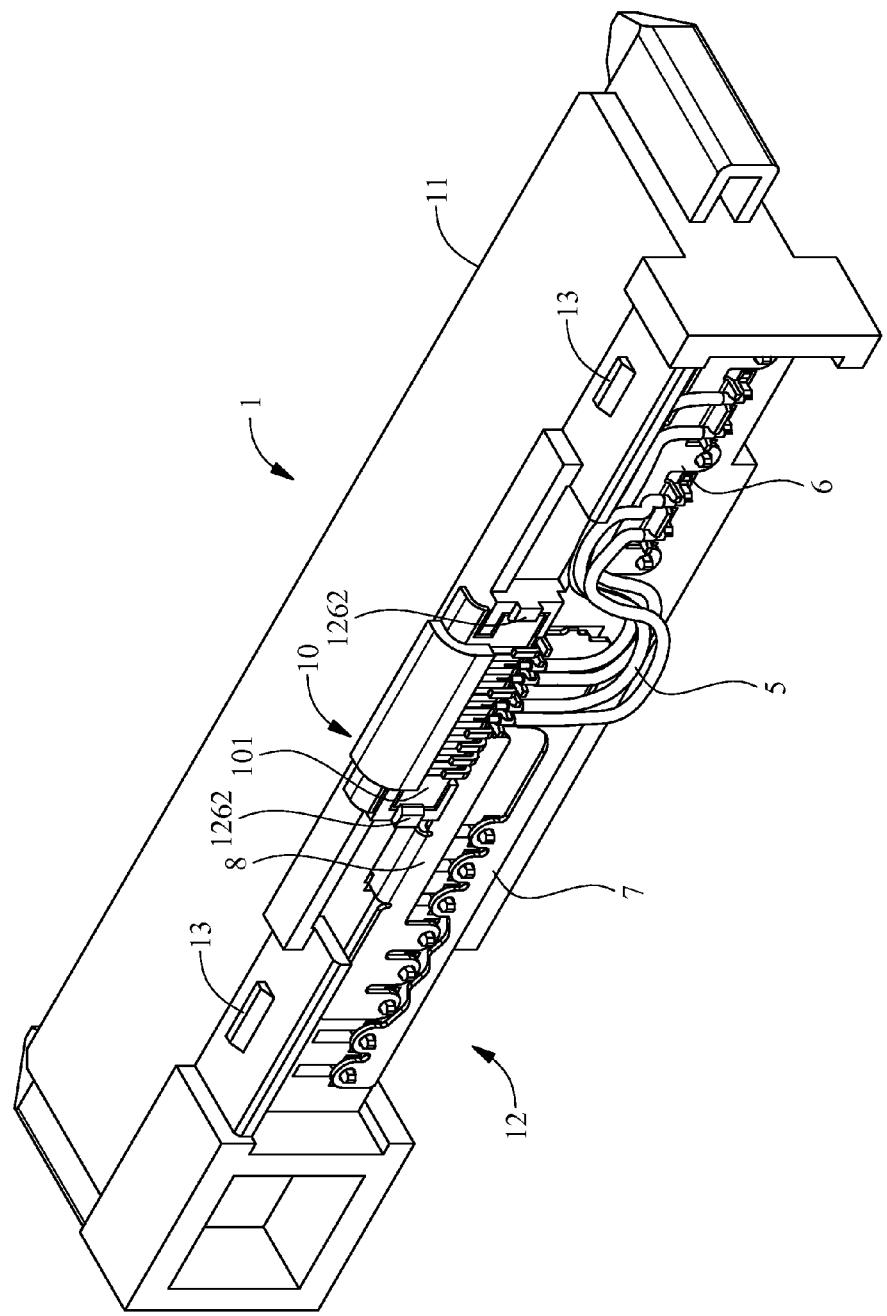
FIG. 3 is an assembled schematic view of the SATA hard disk drive connector according to the preferred embodiment of the present invention.
Figure 4:
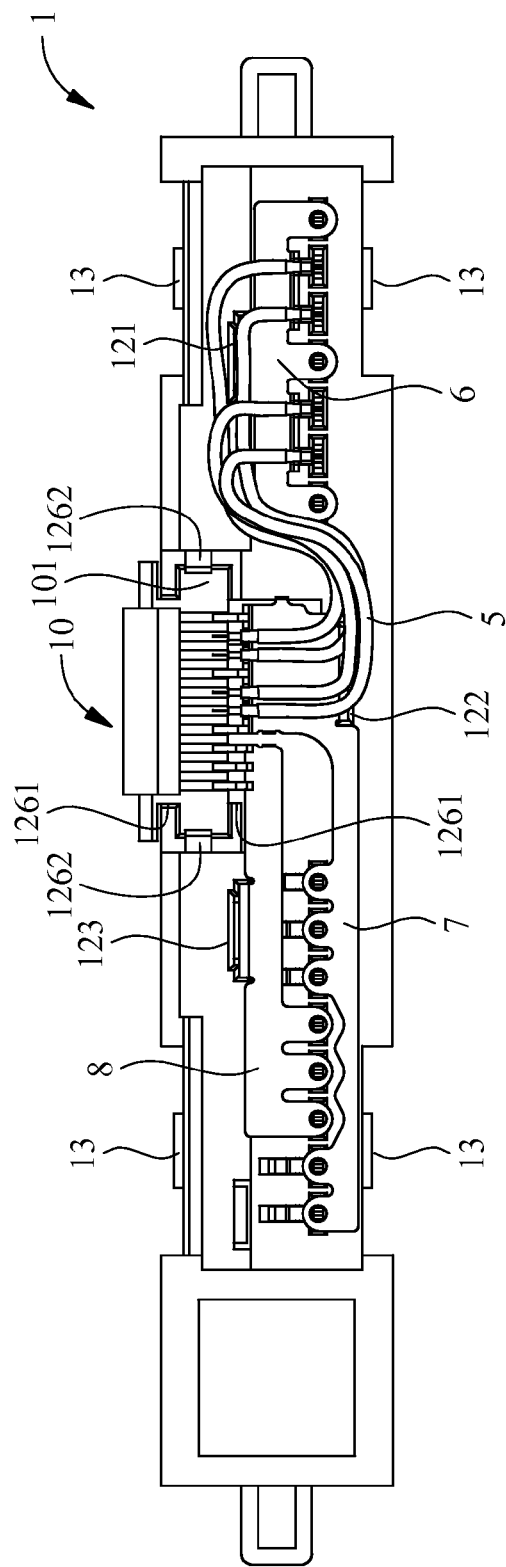
FIG. 4 is a schematic front view of FIG. 3.

Referring to FIG. 1 through FIG. 5, the present invention provides a SATA hard disk drive connector which comprises a body 1, a signal pin unit 2, a power pin unit 3, four micro coaxial cables 5, a first grounding unit 6, a second grounding unit 7 and an electrical connection unit 8. The body 1 is connected to a SATA hard disk drive (not shown). The body 1 is a hexahedron with a SATA hard disk drive connection side 11 and a circuit receiving side 12 opposing the SATA hard disk drive connection side 11. A signal slot 111 and a power slot 112, which are spaced apart and parallel to each other, are disposed on the SATA hard disk drive connection side 11 to connect with the SATA hard disk drive. The signal pin unit 2 is disposed at the body 1. The signal pin unit 2 has a first signal transmitting pin (+)21, a second signal transmitting pin (−)22, a first signal receiving pin (+)23, a second signal receiving pin (−)24 and a plurality of first grounding pins 25. The circuit receiving side 12 of the body 1 has a plurality of signal pin unit fixing channels 124 in communication with the signal slot 111. The rear segments of the first signal transmitting pin 21, the second signal transmitting pin 22, the first signal receiving pin 23, the second signal receiving pin 24 and the first grounding pins 25 are fixed to the signal pin unit fixing channels 124, respectively. The front segments of the first signal transmitting pin 21, the second signal transmitting pin 22, the first signal receiving pin 23, the second signal receiving pin 24 and the first grounding pins 25 are exposed from the signal slot 111 to electrically connect with the SATA hard disk drive. The power pin unit 3 is disposed at the body 1. The power pin unit 3 has a plurality of power pins 31 and a plurality of second grounding pins 32. The circuit receiving side 12 of the body 1 has a plurality of power pin unit fixing channels 125 in communication with the power slot 112. The rear segments of the power pins 31 and the second grounding pins 32 are fixed to the power pin unit fixing channels 125, respectively. The front segments of the power pins 31 and the second grounding pins 32 are exposed from the power slot 112 to electrically connect with the SATA hard disk drive. The micro coaxial cables 5 each have a conducting wire 51, a tubelike insulating inner layer 52, a tubelike shielding woven layer 53 and a tubelike insulating coating 54 which are arranged from inside to outside. The two ends of each of the conducting wires 51 are exposed. The two ends of each of the tubelike shielding woven layers 53 are exposed. The conducting wires 51 are electrically connected to the rear ends of the first signal transmitting pin 21, the second signal transmitting pin 22, the first signal receiving pin 23 and the second signal receiving pin 24, respectively, at one end and electrically connected to leads of an external cable 10, respectively, at the other end. The micro coaxial cables 5, exclusive of the two ends, are suspended or fixed to the circuit receiving side 12 of the body 1. The first grounding unit 6 is disposed at the circuit receiving side 12 of the body 1. The first grounding unit 6 is electrically connected to an end of each of the tubelike shielding woven layers 53 and the first grounding pins 25. The second grounding unit 7 is disposed at the circuit receiving side 12 of the body 1. The second grounding unit 7 is electrically connected to the second grounding pins 32, electrically connected to another end of each of the tubelike shielding woven layers 53, and electrically connected to the external cable 10. The electrical connection unit 8 is disposed at the circuit receiving side 12 of the body 1. The electrical connection unit 8 is electrically connected to the power pins 31 and electrically connected to the external cable 10.

As mentioned before, the SATA hard disk drive connector of the present invention is characterized in that the tubelike shielding woven layer 53, the first grounding unit 6 and the second grounding unit 7 together ground the noise generated from the conducting wires 51 to thereby prevent the noise from interfering with any external electronic component.

Referring to FIG. 1 through FIG. 4, as regards the SATA hard disk drive connector, a receiving chamber 126 is disposed at the upper edge of the circuit receiving side 12 of the body 1. A limiting opening 1261 is disposed at the upper edge of the receiving chamber 126. The receiving chamber 126 is adapted to receive a plug 101 of the external cable 10. The limiting opening 1261 is smaller than the plug 101 of the external cable 10 to thereby confine the plug 101 of the external cable 10 to the receiving chamber 126. Hence, the receiving chamber 126 and the limiting opening 1261 together prevent the plug 101 of the external cable 10 from being pulled out under an external force all of a sudden.

Referring to FIG. 1 through FIG. 4, as regards the SATA hard disk drive connector, a stop bump 1262 is disposed on each of the two sides at the top of the receiving chamber 126 and protrudes into the receiving chamber 126. The stop bumps 1262 are adapted to abut against the two sides of the plug 101 of the external cable 10, respectively. Hence, the stop bumps 1262 together prevent the plug 101 of the external cable 10 from being pulled out under an external force all of a sudden.

Referring to FIG. 1 through FIG. 4, as regards the SATA hard disk drive connector, the circuit receiving side 12 of the body 1 has a first slot 121 which is disposed above the signal pin unit fixing channels 124. The signal pin unit 2 has three first grounding pins 25. The first grounding unit 6 has a first board 60. A first engagement plate 61 is disposed at the upper edge of the first board 60 in a manner to extend outward and bend toward the body 1. Four first clamp slots 62 are disposed at the lower edge of the first board 60 in a manner to extend outward and bend away from the body 1. Three first grounding plates 63 are disposed at the lower edge of the first board 60 in a manner to extend downward and be spaced apart from each other. Every two first clamp slots 62 are disposed between every two first grounding plates 63. The first engagement plate 61 is inserted into the first slot 121. The first clamp slots 62 each clamp an end of a corresponding one of the tubelike shielding woven layers 53. The first grounding plates 63 are electrically connected to the rear ends of the first grounding pins 25, respectively. The other ends of the conducting wires 51 are electrically connected to leads of the external cable 10, respectively, through the limiting opening 1261 at the lower edge of the receiving chamber 126. Hence, it is easy to mount the first grounding unit 6 on the body 1 and the first grounding pins 25 and easy to connect the micro coaxial cables 5 to the first grounding unit 6.

Referring to FIG. 1 through FIG. 4, as regards the SATA hard disk drive connector, the circuit receiving side 12 of the body 1 has a second slot 122 disposed between the signal pin unit fixing channels 124 and the power pin unit fixing channels 125. The power pin unit 3 has five second grounding pins 32. The second grounding unit 7 has a second board 70. The second board 70 is L-shaped. A second engagement plate 71 is disposed at the lower edge of the second board 70 in a manner to extend outward and bend toward the body 1. Four second clamp slots 72 are disposed at the upper edge of the second board 70 in a manner to extend outward and bend away from the body 1. Three second outward grounding pins 74 are disposed at the upper edge of the second board 70 in a manner to extend upward and be spaced apart from each other. Every two second clamp slots 72 are disposed between every two second outward grounding pins 74. The second engagement plate 71 is inserted into the second slot 122. The second clamp slots 72 clamp the other ends of the tubelike shielding woven layers 53, respectively. The second board 70 is electrically connected to the rear ends of the second grounding pins 32. The second outward grounding pins 74 are electrically connected to leads of the external cable 10, respectively, through the limiting opening 1261 at the lower edge of the receiving chamber 126. Hence, it is easy to mount the second grounding unit 7 on the body 1 and the second grounding pins 32 and easy to connect the micro coaxial cables 5 to the second grounding unit 7.

Referring to FIG. 1 through FIG. 4, as regards the SATA hard disk drive connector, the circuit receiving side 12 of the body 1 has a third slot 123 disposed above the power pin unit fixing channels 125. The power pin unit 3 has three power pins 31. The electrical connection unit 8 has a third board 80. A third engagement plate 81 is disposed at the upper edge of the third board 80 in a manner to extend outward and bend toward the body 1. Three third outward electrical connection pins 84 are disposed at the upper edge of the third board 80 in a manner to extend upward and be spaced apart from each other. The third engagement plate 81 is inserted into the third slot 123. The third board 80 is electrically connected to the rear ends of the power pins 31. The third outward electrical connection pins 84 are electrically connected to leads of the external cable 10, respectively, through the limiting opening 1261 at the lower edge of the receiving chamber 126. Hence, it is easy to mount the electrical connection unit 8 on the body 1 and the power pins 31.

Referring to FIG. 1 through FIG. 4, as regards the SATA hard disk drive connector, five second grounding plates 73 are disposed at the upper edge of the second board 70 in a manner to extend upward and be spaced apart from each other. The circuit receiving side 12 of the body 1 has a third slot 123 disposed above the power pin unit fixing channels 125. The power pin unit 3 has three power pins 31. The electrical connection unit 8 has a third board 80. A third engagement plate 81 is disposed at the upper edge of the third board 80 in a manner to extend outward and bend toward the body 1. Three third electrical connection plates 83 are disposed at the lower edge of the third board 80 in a manner to extend downward and be spaced apart from each other. Three third outward electrical connection pins 84 are disposed at the upper edge of the third board 80 in a manner to extend upward and be spaced apart from each other. The third engagement plate 81 is inserted into the third slot 123. The third electrical connection plates 83 are electrically connected to the rear ends of the power pins 31, respectively. The second grounding plates 73 are electrically connected to the rear ends of the second grounding pins 32, respectively. The third electrical connection plates 83 are disposed between the two second grounding plates 73 and the three second grounding plates 73. The third outward electrical connection pins 84 are electrically connected to leads of the external cable 10, respectively, through the limiting opening 1261 at the lower edge of the receiving chamber 126.

Figure 5:
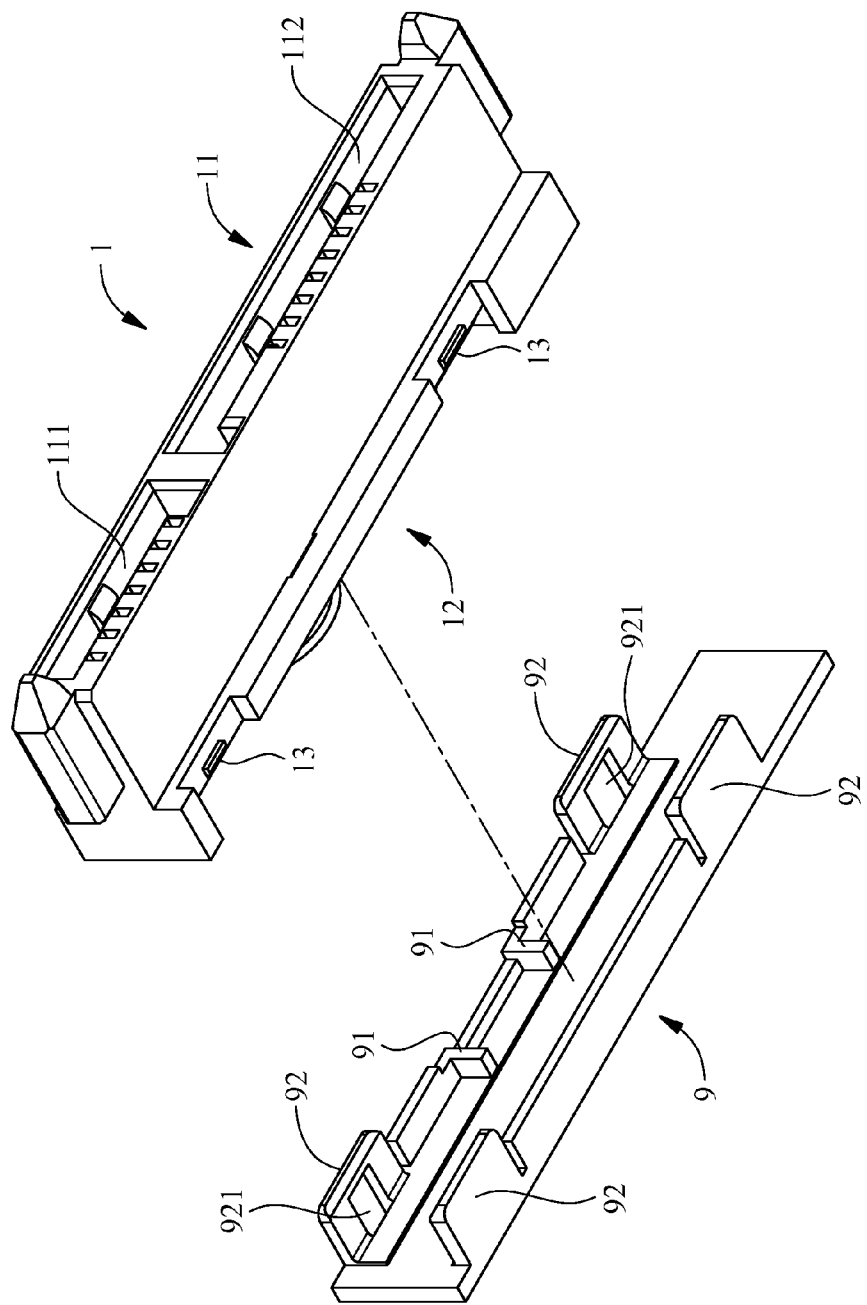
FIG. 5 is a schematic view of the SATA hard disk drive connector before a protective lid is mounted thereon according to the preferred embodiment of the present invention.
Figure 6:
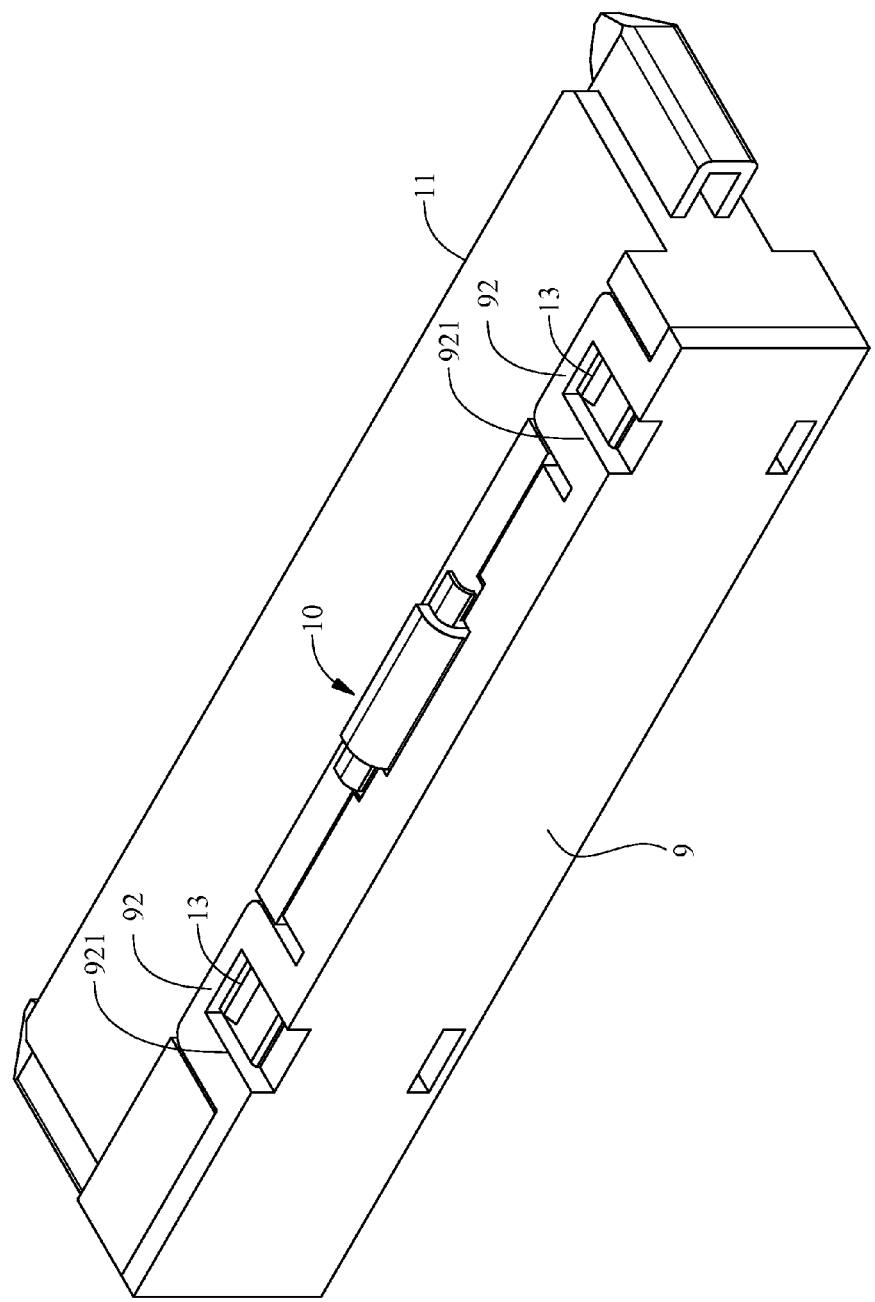
FIG. 6 is a schematic view of the SATA hard disk drive connector after the protective lid is mounted thereon according to the preferred embodiment of the present invention.

Referring to FIG. 5 and FIG. 6, the SATA hard disk drive connector further comprises a protective lid 9. Two abutting blocks 91 are disposed on the inner side of the protective lid 9 and spaced apart from each other. The protective lid 9 is disposed on the circuit receiving side 12 of the body 1 to hide the signal pin unit 2, the power pin unit 3, the micro coaxial cables 5, the first grounding unit 6, the second grounding unit 7 and the electrical connection unit 8. The protective lid 9 hides the plug 101 of the external cable 10. The abutting blocks 91 are adapted to abut against the two sides of the plug 101 of the external cable 10, respectively. Hence, the protective lid 9 serves to protect the signal pin unit 2, the power pin unit 3, the micro coaxial cables 5, the first grounding unit 6, the second grounding unit 7 and the electrical connection unit 8. The abutting blocks 91 together prevent the plug 101 of the external cable 10 from being pulled out under an external force all of a sudden.

Referring to FIG. 5 and FIG. 6, as regards the SATA hard disk drive connector, a plurality of snap-engagement tenons 13 is disposed at the upper edge and the lower edge of the circuit receiving side 12 of the body 1, whereas a plurality of snap-engagement arms 92 is disposed at the upper edge and the lower edge of the protective lid 9. The snap-engagement arms 92 each have a snap-engagement mortise 921. The snap-engagement mortises 921 are snap-engaged with the snap-engagement tenons 13, respectively. Hence, it is easy to mount the protective lid 9 on the circuit receiving side 12 of the body 1.

The present invention is disclosed above by preferred embodiments. However, persons skilled in the art should understand that the preferred embodiments are illustrative of the present invention only, but should not be interpreted as restrictive of the scope of the present invention. Hence, all equivalent modifications and replacements made to the aforesaid embodiments should fall within the scope of the present invention. Accordingly, the legal protection for the present invention should be defined by the appended claims.

What is claimed is:
1. A SATA hard disk drive connector, comprising:
a body connected to a SATA hard disk drive;

a signal pin unit disposed at the body and having a first signal transmitting pin, a second signal transmitting pin, a first signal receiving pin, a second signal receiving pin and a plurality of first grounding pins;

a power pin unit disposed at the body and having a plurality of power pins and a plurality of second grounding pins;

four micro coaxial cables each having a conducting wire, a tubelike insulating inner layer, a tubelike shielding woven layer and a tubelike insulating coating arranged from inside to outside, wherein the conducting wires are electrically connected to the first signal transmitting pin, the second signal transmitting pin, the first signal receiving pin and the second signal receiving pin, respectively, at one end and electrically connected to an external cable at another end;

a first grounding unit disposed at the body and electrically connected to an end of each of the tubelike shielding woven layers and the first grounding pins;

a second grounding unit disposed at the body and electrically connected to the second grounding pins, another end of each of the tubelike shielding woven layers, and the external cable; and an electrical connection unit disposed at the body and electrically connected to the power pins and the external cable.

2. The SATA hard disk drive connector of claim 1, wherein the body is provided with a first slot, the signal pin unit with three first grounding pins, and the first grounding unit with a first board, wherein an edge of the first board has a first engagement plate extending outward and bending, four first clamp slots extending outward and bending, and three first grounding plates extending outward and spaced apart from each other, wherein every two first clamp slots are disposed between every two first grounding plates, with the first engagement plate inserted into the first slot, wherein the first clamp slots each clamp an end of a corresponding one of the tubelike shielding woven layers, wherein the first grounding plates are electrically connected to the first grounding pins, respectively.

3. The SATA hard disk drive connector of claim 1, wherein the body is provided with a third slot, the power pin unit with three power pins, and the electrical connection unit with a third board, wherein an edge of the third board has a third engagement plate extending outward and bending and three third outward electrical connection pins extending outward and spaced apart from each other, with the third engagement plate inserted into the third slot, wherein the third board is electrically connected to the power pins, wherein the third outward electrical connection pins are electrically connected to the external cable.

4. The SATA hard disk drive connector of claim 1, wherein the body has a receiving chamber, wherein a limiting opening is disposed at an edge of the receiving chamber, wherein the receiving chamber receives a plug of the external cable, wherein the limiting opening is smaller than the plug of the external cable to thereby confine the plug of the external cable to the receiving chamber.

5. The SATA hard disk drive connector of claim 4, wherein a stop bump is disposed on each of two sides on top of the receiving chamber and protrudes into the receiving chamber such that the stop bumps abut against the plug of the external cable.

6. The SATA hard disk drive connector of claim 1, wherein the body is provided with a second slot, the power pin unit with five second grounding pins, and the second grounding unit with a second board, wherein an edge of the second board has a second engagement plate extending outward and bending, four second clamp slots extending outward and bending, and three second outward grounding pins extending outward and spaced apart from each other, wherein every two second clamp slots are disposed between every two second outward grounding pins, with the second engagement plate inserted into the second slot, wherein the second clamp slots each clamp another end of a corresponding one of the tubelike shielding woven layers, wherein the second board is electrically connected to the second grounding pins, wherein the second outward grounding pins are electrically connected to the external cable.

7. The SATA hard disk drive connector of claim 6, wherein the edge of the second board has five second grounding plates extending outward and spaced apart from each other, wherein the body is provided with a third slot, the power pin unit with three power pins, and the electrical connection unit with a third board, wherein the edge of the third board has a third engagement plate extending outward and bending, three third electrical connection plates extending outward and spaced apart from each other, and three third outward electrical connection pins extending outward and spaced apart from each other, with the third engagement plate inserted into the third slot, with the third electrical connection plates electrically connected to the power pins, respectively, with the second grounding plates electrically connected to the second grounding pins, respectively, wherein the third electrical connection plates are disposed between two second grounding plates and three second grounding plates, with the third outward electrical connection pins electrically connected to the external cable.

8. The SATA hard disk drive connector of claim 1, further comprising a protective lid, wherein two abutting blocks are disposed on an inner side of the protective lid and spaced apart from each other, wherein the protective lid is disposed at the body to hide the signal pin unit, the power pin unit, the micro coaxial cables, the first grounding unit, the second grounding unit and the electrical connection unit, wherein the protective lid hides a plug of the external cable, wherein the abutting blocks abut against two sides of the plug of the external cable, respectively.

9. The SATA hard disk drive connector of claim 8, wherein a plurality of snap-engagement tenons is disposed at an edge of the body, and a plurality of snap-engagement arms is disposed at an edge of the protective lid, with the snap-engagement arms each having a snap-engagement mortise, wherein the snap-engagement mortises are snap-engaged with the snap-engagement tenons, respectively.

* * * * *